UNITED STATES PATENT OFFICE.

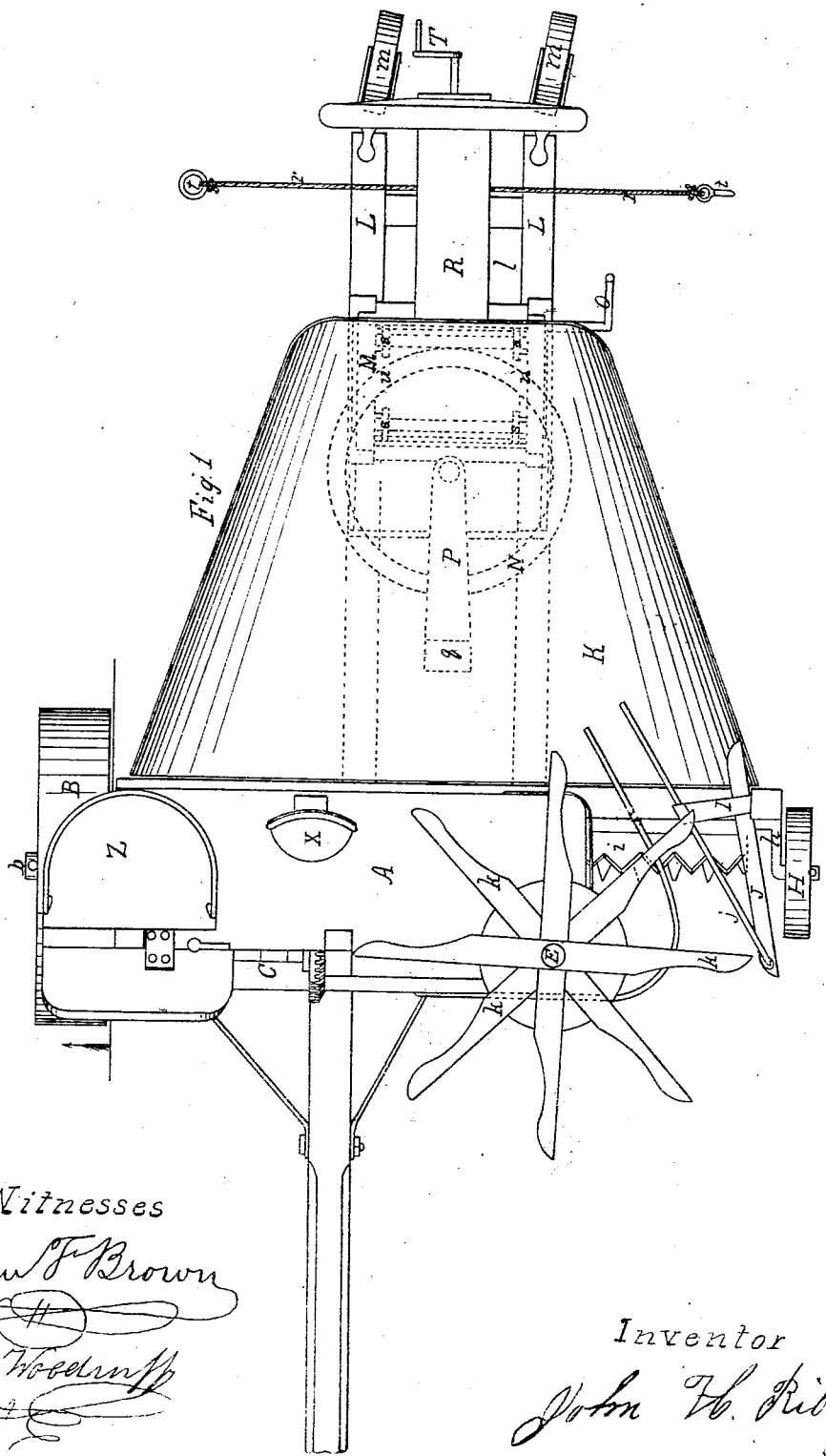

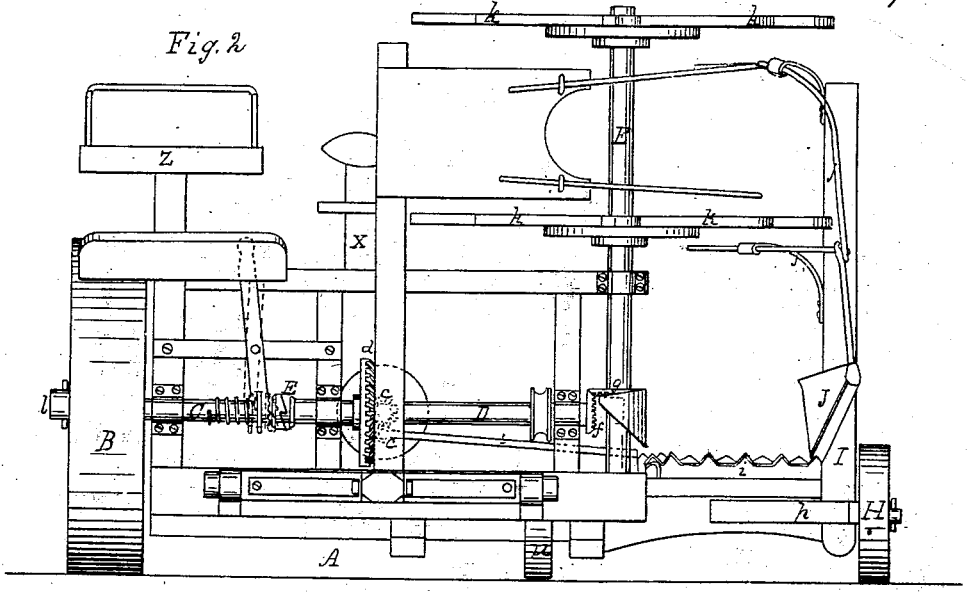

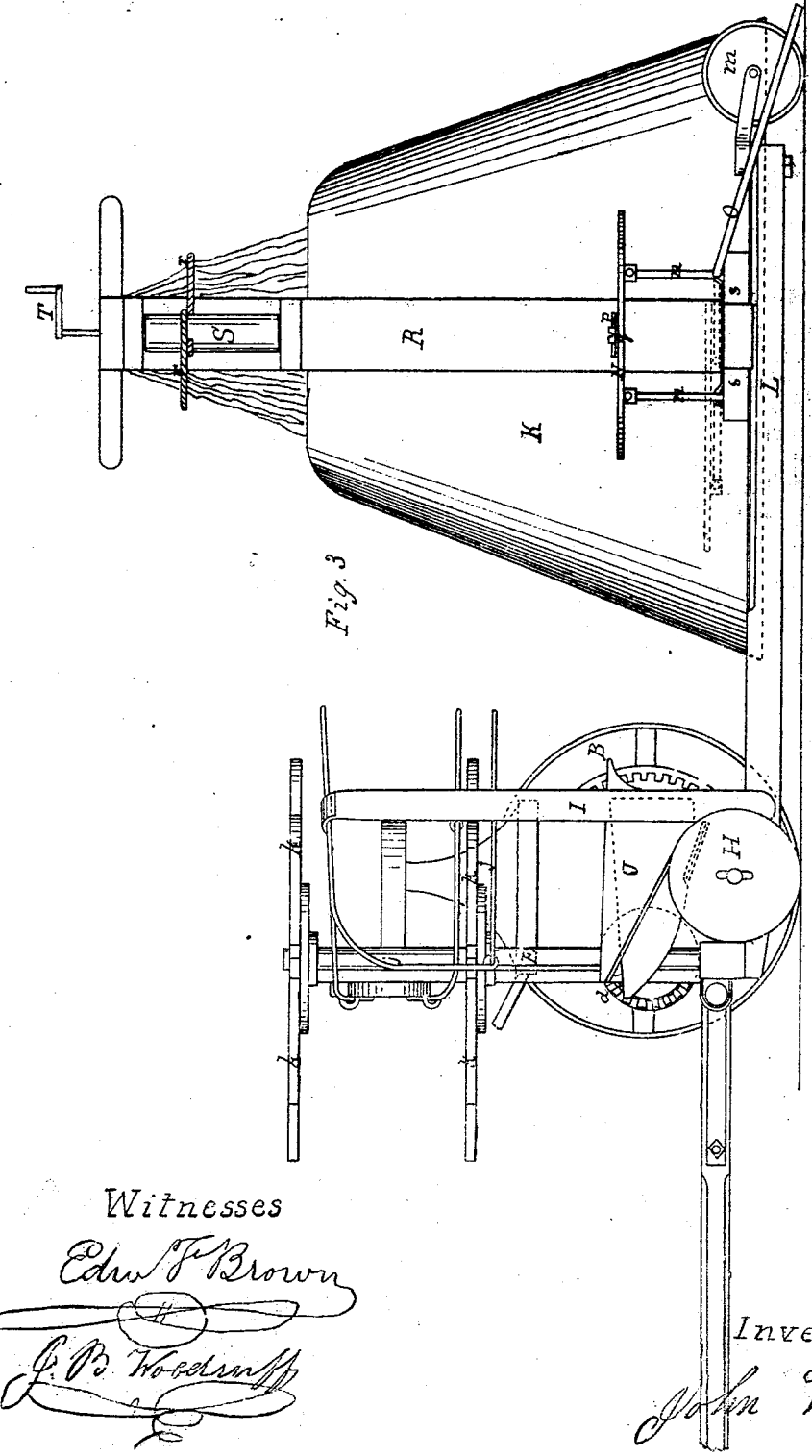

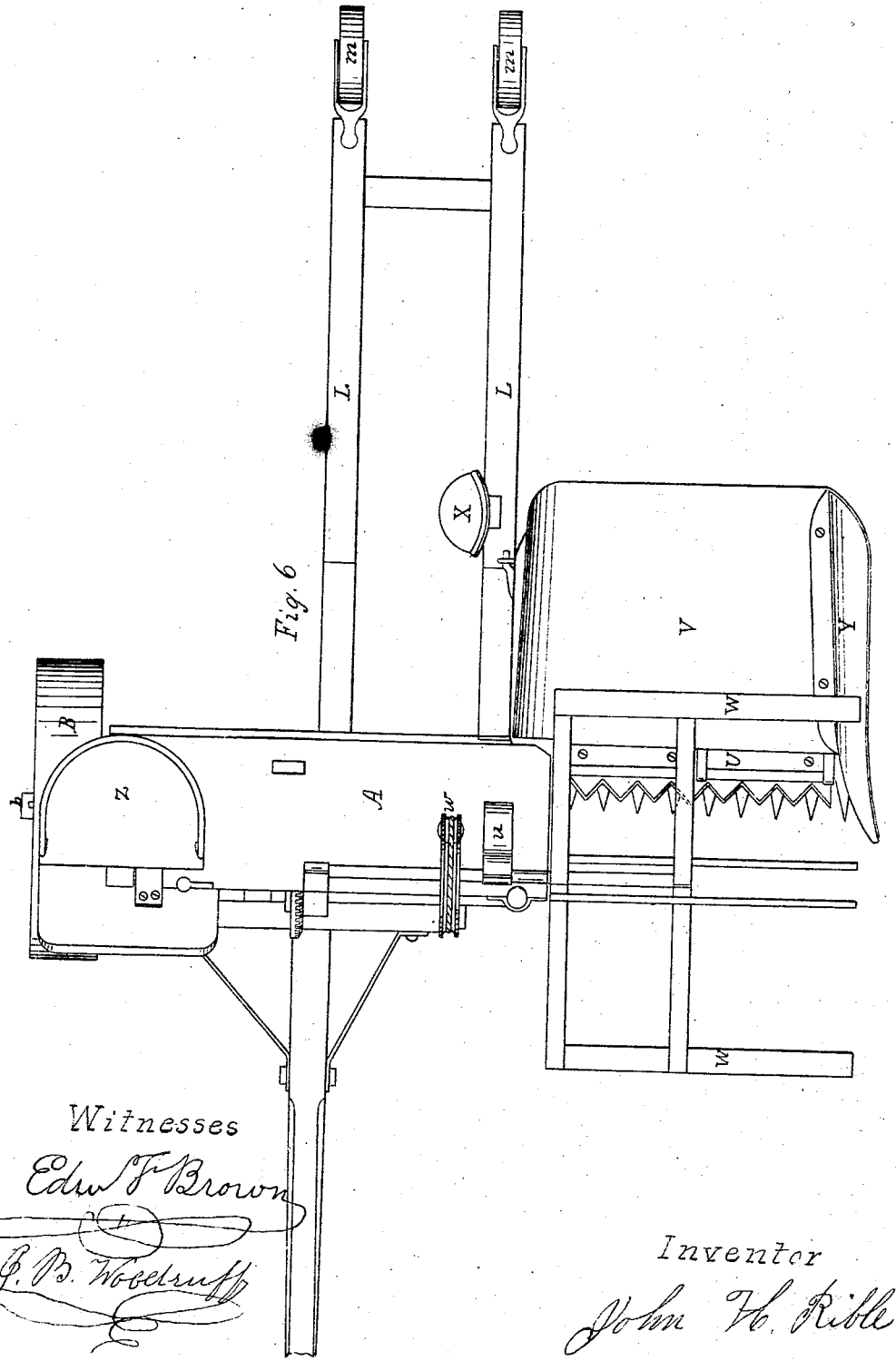

JOHN H. RIBLE, OF SOMERSET, OHIO, ASSIGNOR TO JACOB W. BOPE, OF ST. LOUIS, MISSOURI.

IMPROVEMENT IN HARVESTING-MACHINES.

Specification forming part of Letters Patent No. 29,129, dated July 10, 1860.

*To all whom it may concern:*

Be it known that I, JOHN H. RIBLE, of Somerset, in the county of Perry and State of Ohio, have invented new and useful Improvements in Maize or Indian-Corn Harvesters, as also a Reaper Attachment; and I do hereby declare that the following is a clear and exact description of the same, reference being had to the accompanying drawings, making a part of this specification, in which—

Plate 1, Figure 1 represents a top view of the Indian-corn-gathering arrangement. Fig. 2 shows the front end view of the cutting and gathering mechanism. Fig. 3 shows a side elevation of the machine, the receiving-platform turned up in position for shocking up in stacks. Fig. 4 is the driving wheel and pinion. Fig. 5 is the corn-cutter detached. Plate 2, Fig. 6 shows a top view of the grain-harvester attachment, the corn-gathering fixtures being removed. Fig. 7 shows the grain-cutting mechanism and platform for it to lodge on in perspective.

My invention relates to certain improvements in corn-harvesting machines, with mechanism for binding and discharging the corn in shocks or sheafs set on end, as hereinafter fully described.

To enable others skilled in the art to make and use my invention, I will proceed to describe it more fully, referring to the drawings and the letters marked thereon.

A represents the general frame-work of the machine, which is made of hard wood, plank, and joist framed and bolted together in the most convenient form to support the journal boxes and bearings for the driving-wheel B, shaft $b$, pinion-shaft C, clutch-shaft D, crank-shaft $c$, and upright gathering or reel shaft E, as well as all of the other mechanism, which consists of the bevel-gear wheels $d\ e$ to work the cutter-bar $i$, the bevel-gear $f\ g$ to turn the shaft on which the vertical reel or gathering-fingers are attached, the clutch F to operate or stop the working of the machine, the main driving-pinion $a$, which communicates motion and power from the main wheel B. The bottom cross-timber extends beyond the rest of the frame sufficient distance to support the cutting mechanism, and keeps the machine in a line of draft by a supporting-wheel, H, on a fixed axle, $h$. To the end of the timber, extending out to support the cutter-bar $i$, is fixed an upright post, I, which has a dividing-arm, J, secured to it, and also metal frame-work $jj$, extending above and back to guide the stalks, as they are carried in by the gathering-fingers $k\ k\ k\ k$, against the cutter and back onto the platform K. About the center of the cross-timber, from the under side, are secured two parallel timbers, L L, extending back some distance, the rear ends being connected by a cross-tie, $b$, these timbers being supported by two caster-rollers, $m\ m$.

At the rear end of the timbers L L are ways or rails, on which is mounted on trucks $s\ s\ s\ s$ a frame, M, upon the top of which is mounted a circular disk, N, made of metal, and hinged in four places onto the ends of the rock-shaft levers $n\ n$, which, by the action of the hand-lever O, is elevated and supported on the levers $n\ n$, they being then in a vertical position.

On the center of the disk N is pivoted a bar or plate of metal, P, it having a hinge, $q$, to which is hinged a plank, R, the same being the support of the receiving-platform K, as also the compressing mechanism for binding, which is made to operate in the following manner:

Under the rear end of the plank R is a simple roller or windlass, S, through which a rope or cord, $r\ r$, is passed, having hooks $t\ t$ at the ends.

The operation of binding is performed by laying a band or wisp of straw onto the rear end of the platform K, and when a sufficient quantity has been cut and fallen across the band the hooks are brought together and hooked over the fallen stalks. Then by turning the crank T the windlass S, drawing on the cords $r\ r$, compresses them into a compact body, when they are easily tied up. Then by loosening the hooks on the cords the sheaf or shock is ready to be set up, and to effect this the platform K is raised by the hand-lever O, and then swiveled round on the disk N to any desirable point and dumped, so as to set the shock on end, as seen in Fig. 3. The receiving-platform being brought back again to its level and placed in its proper position, another band is laid on and the machine is ready to progress for another shock.

In changing my machine from an Indian-corn harvester to a reaper the gathering, cutting, and receiving mechanism is removed and laid aside, and the grain-cutting apparatus, consisting of the reel, cutter-bar, receiving-platform, and their appendages, is attached, as shown in drawings, Plate No. 2, Figs. 6 and 7.

The frame that supports the cutter-bar U and the receiving-platform V is hinged to the frame A, so as to allow it to move up or down to conform to the surface of the ground. The dividing-finger Y and end next the standing grain are supported by the small wheel &. The small wheel $u$ under the frame A only comes in requisition when the machine is used as a reaper. The reel W and raker's seat or support X are attached as shown in Fig. 6. The raker's seat X is placed on the top of the frame, near the driver's seat Z, when it is used as a corn-harvester, as seen in Figs. 1 and 2, Plate 1.

Fig. 7 shows in perspective the grain-cutting mechanism U, the platform V, the dividing-finger Y, and supporting-wheel &.

It will readily be seen that the advantages to be derived from my reaper attachment to a corn-harvester are that a farmer can have a machine to do both kinds of harvesting in their season at a very small outlay above what either costs separately.

The advantages of my maize or Indian-corn harvester are that the cornstalks are cut and deposited parallel on the platform, which is made to retain a sufficient quantity for a shock. Then, by the aid of the binding mechanism above described, the tops are all firmly secured together, when they are dumped on end, and are as perfectly and securely stacked as though each stalk had been set up separately, thus saving hand-labor in gathering and curing the product.

Having thus fully described my invention and modes of operation, what I claim as new, and desire to secure by Letters Patent, is—

1. In combination with the main frame and gearing for operating the cutter and reel, the elevating and dumping platform, the parts being arranged and operating in the manner and for the purposes specified.

2. The combination of the mechanism for binding, elevating, and dumping the shock, substantially as described.

3. The revolving platform K, in combination with the cutting apparatus and elevating mechanism, constructed, arranged, and operated in the manner described, for the purposes specified.

JOHN H. RIBLE.

Witnesses:
   EDM. F. BROWN,
   J. B. WOODRUFF.